United States Patent [19]

Siller

[11] 4,442,183
[45] Apr. 10, 1984

[54] ATMOSPHERIC OXYGEN ELEMENT WITH POSITIVE ELECTRODE PLATES

[76] Inventor: Bruno Siller, Freigasse 24, D-7090 Ellwangen, Fed. Rep. of Germany

[21] Appl. No.: 311,458

[22] Filed: Oct. 14, 1981

[30] Foreign Application Priority Data

Oct. 24, 1980 [DE]  Fed. Rep. of Germany ....... 3040093

[51] Int. Cl.³ .............................................. H01M 4/00
[52] U.S. Cl. ...................................... 429/29; 429/40; 429/199
[58] Field of Search ....................... 429/40, 27, 28, 29, 429/209, 224, 199

[56] References Cited

U.S. PATENT DOCUMENTS

| | | | |
|---|---|---|---|
| 2,572,918 | 10/1951 | Fischer et al. | 429/27 |
| 2,724,010 | 11/1955 | Fischer et al. | 429/27 |
| 3,306,781 | 2/1967 | Siller | 429/224 X |
| 3,532,550 | 10/1970 | Truitt | 429/40 X |
| 3,533,845 | 10/1970 | Katsoulis | 429/27 |
| 3,592,695 | 7/1971 | Moran | 429/40 X |
| 3,598,655 | 8/1971 | Hamlen et al. | 429/27 |
| 3,617,385 | 11/1971 | Gray | 429/40 X |
| 3,770,504 | 11/1973 | Bergum | 429/224 X |
| 3,871,922 | 3/1975 | Böhm | 429/40 |

Primary Examiner—Charles F. LeFevour
Attorney, Agent, or Firm—Cushman, Darby & Cushman

[57] ABSTRACT

An atmospheric oxygen element. The element comprises a substantially planar carrier structure comprising a central foil member and conductive sheets on either side thereof, positive electrode plates adhered to each of the guide sheets, a cover for covering the upper surface of the positive electrode plates defining a plurality of openings for allowing the passage of air therethrough, a coating for substantially covering the exterior surfaces of the element, and protective structure for protecting the openings.

23 Claims, 10 Drawing Figures

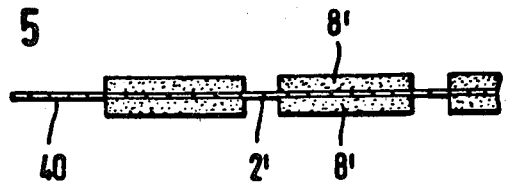
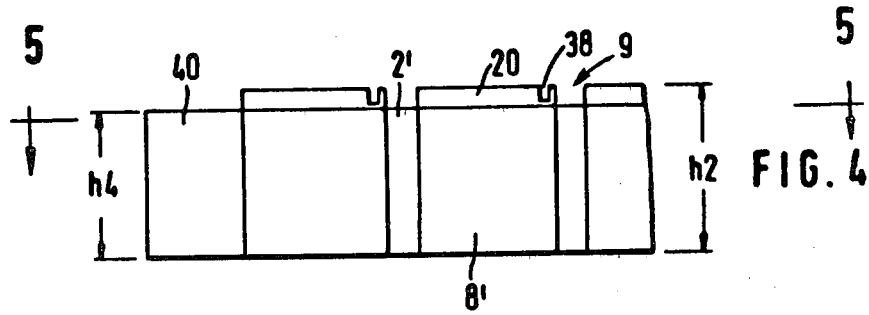
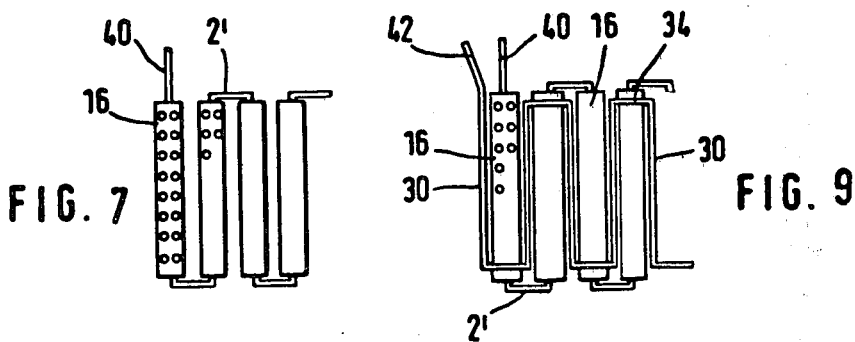
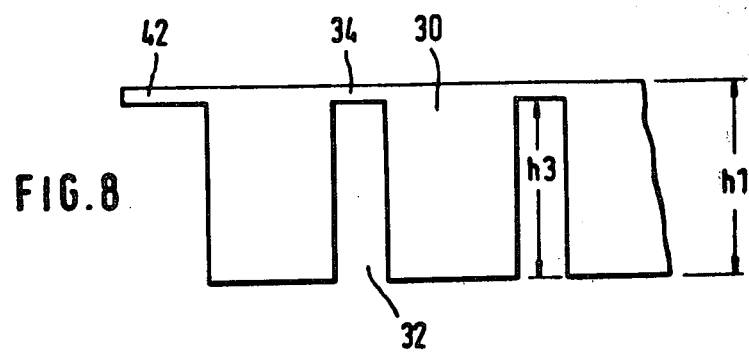

ATMOSPHERIC OXYGEN ELEMENT WITH POSITIVE ELECTRODE PLATES

BACKGROUND AND SUMMARY OF INVENTION

The present invention relates to a novel atmospheric oxygen element and assembly thereof with characteristics as disclosed by German Auslegeschrift No. 2,331,739, the entire disclosure of which is incorporated herein by reference as is the priority document referenced in my attached declaration. Such atmospheric oxygen elements have a negative electrode preferably of zinc and an electrolyte of manganese (II) chloride. The positive, active electrode mass, also called the depoolarizer mass, comprises, for example, activated charcoal with admixtures.

The carrier foil of the known atmospheric oxygen element is conventionally folded around a piece of cardboard stamped out in the shape of a comb so that a unilaterally open pocket is formed into which air may penetrate. The electrode mass pressed into conventional electrode plates is positioned on the exterior of the carrier foil. The part of the carrier foil covered by the electrode plates has punched holes so that air may penetrate into the positive electrode plates from the open pocket through the carrier foil. Thus, air always penetrates from the open pocket through the carrier foil into a broad side of the electrode plates according to conventional elements.

For a secure holding of the electrode plates on the carrier foil, the arrangement of carrier foil and electrodes is then dipped into a stiffening varnish, for example, cellulose triacetate varnish, to a depth deep enough so that not only the electrode plates themselves, but a part of the carrier foils projecting above the electrode plates are coated by the lacquer.

Atmospheric oxygen elements with manganese chloride as an electrolyte have a very high specific capacity (Ah/cm$^3$) and an excellent storage life. Smaller elements, however, have too low a current carrying capacity. As a result of the present invention, the carrying capacity is increased such that elements of the size of monocells may deliver about 200 mA, thereby replacing monocells. In order to achieve this, the present invention reduces the thickness of the plate-shaped elements considerably, so that it will be possible to accommodate more positive and negative electrode surfaces in a given container.

Surprisingly, a current carrying capacity of 2 mA/cm$^2$ cathode surface, as is customary with conventional plate elements, may be achieved according to the present invention with considerably smaller thicknesses of the positive electrode mass layer.

According to the present invention, a carrier foil which has a conductive foil on either side is provided on both sides with a positive electrode plate. The positive electrode mass of the present invention is applied particularly loosely so that a supply of atmospheric oxygen from the front of the element is sufficient.

The supply of atmospheric oxygen according to the present invention is accomplished by utilizing a front cover plate having air feeders. Thus, according to the present invention, the stiffening varnish is kept free of the air feeders during the customary dipping process, and, additionally, the electrolyte is prevented from penetrating into the interior portions of the positive electrode through the air feeders. Moreover, the stiffening varnish adheres safely to the cover plate so that any curving of the electrode plates under the influence of the stiffening varnish contracting and breaking loose from the carrier foil during drying is prevented. In order to achieve the above simultaneously, the air feeders are protected by lateral upwardly extending walls which protect the air feeders from the varnish yet allows support of the cover and electrode plates.

The individual positive electrodes according to the present invention may be placed in a container in larger numbers, when compared to conventional assemblies by alternating with negative electrodes. As a result, a higher overall current carrying capacity may be achieved.

The lateral walls provided according to the present invention, which surround and protect the air feeders of the cover plate, may surround the cover plate as a whole or particular groupings of the air feeders. Alternately, individual wall members may be provided to individually protect each air feeder.

The positive electrode mass must be applied to the carrier foil in a loose manner due to the frontal aeration. Therefore, difficulties may arise for holding the electrode mass firmly on both sides of the carrier foil until the stiffening lacquer dipping process is concluded. The surfaces of the carrier foil may be treated chemically in a suitable manner to achieve better adhesion of the electrode mass. Under certain circumstances, it will be sufficient to provide the carrier foil with apertures, so that the electrode masses applied on both sides will bond together. These apertures therefore, contrary to the status of the prior devices, are not required for aeration, although they may make an air exchange between two electrode plates possible.

An additional mechanical protection may be given to the narrow sides of the element left open by the cover plate by utilizing a U-shaped strip.

A single element has particular significance, whenever it is desired to accommodate it in a very flat space. The capacity of such elements may be increased by a parallel connection which conventionally could be achieved in a cumbersome and expensive manner by welding the individual elements together. According to the present invention, however, a parallel connection of several individual elements may be produced without welding or similar processes. Since the individual elements are very thin, an element of greater capacity will be obtained according to this invention in a given space when compared to conventional positive electrode plates.

According to an embodiment of this invention, a continuous carrier foil may be provided with individual positive electrode plates on both sides and may then be rectangularly folded forming a generally square wave shape. The negative electrode is folded in a like manner so that a portion of the negative electrode sheet metal lies between two adjacent positive electrode plates. In this manner, a number of positive and negative electrode plates may be connected in parallel arrangement without the necessity of welding points. An atmospheric oxygen element of this kind does, therefore, not only have a high current carrying capacity but it may also be manufactured at a relatively low cost. It is also possible according to this embodiment to avoid short circuits and secure against longitudinal shifting by a simple spatial arangement of the two interlocking square wave shapes of both electrodes.

BRIEF DESCRIPTION OF THE DRAWINGS

Preferred exemplary embodiments of the present invention will be explained by way of example with reference to the accompanying drawings wherein:

FIG. 4 is a side view of a positive electrode arrangement which is suitable for a sinuous folding;

FIG. 5 is a horizontal cross-sectional view of the positive electrode arrangement depicted in FIG. 4;

FIG. 7 is a plan view of a positive electrode arrangement sinuously folded;

FIG. 8 is a side elevational view showing a negative electrode suitable for a sinuous folding; and FIG. 9 depicts the mutual positioning of the positive and negative electrodes sinuously folded.

DETAILED DESCRIPTION OF THE PREFERRED EXEMPLARY EMBODIMENTS ACCORDING TO THE PRESENT INVENTION

Figure 1:
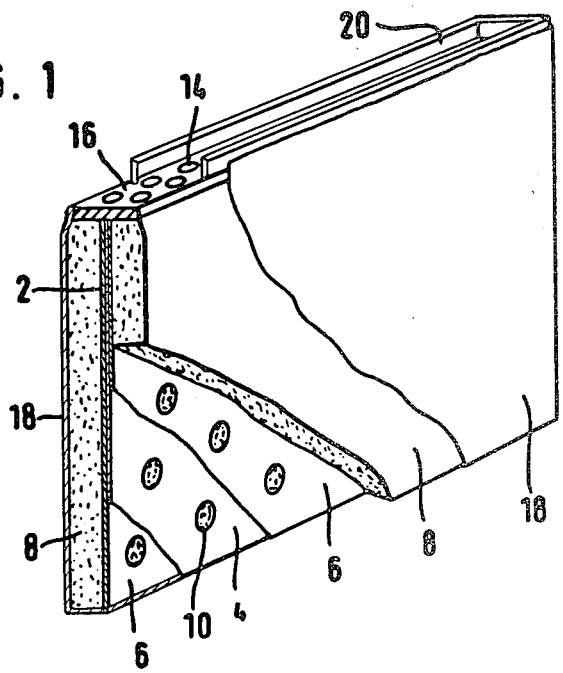
FIG. 1 is a perspective view partially in section of a positive electrode arrangement with one embodiment of lateral walls to protect the air feeders.
Figure 2:
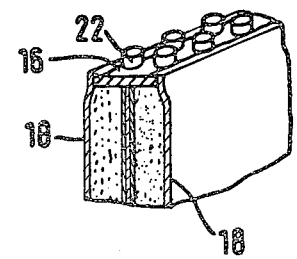
FIG. 2 is a perspective view of the arrangement of FIG. 1 showing another embodiment of the lateral walls to protect the air feeders.
Figure 3A:
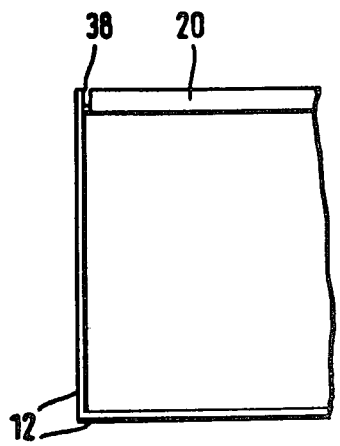
FIG. 3a is a side view depicting an embodiment of a frame and cover for the electrode arrangement.

FIGS. 1-3 show a positive electrode arrangement of an atmospheric oxygen element according to the present invention. As is customary, the positive electrode will be completed by the addition of a negative electrode comprising, for example, zinc and an electrolyte and the two elements will be assimilated into an atmospheric oxygen element assembly, whereby the negative electrode element itself constitutes the container, or a container made of plastic, for example, is additionally provided. The electrolyte can be, for example, manganese-(II)-chloride.

The carrier foil 2 consists of a metal foil 4, which preferably comprises aluminum foil. Metal foil 4 is covered on both sides with a conductive foil 6. The conductive foil 6 consists of a plastic material which is made conductive by the addition of graphite. A preferable conductive foil 6 can be, for example, polyisobutylene. The conductivity of the conductive foil 6 for the passage of electrodes transversely to its main plane will be sufficient, however the conduction of current will be too small along its surface without a considerable voltage drop. Metal foil 4, however, will provide sufficient conductivity in its surface.

Plate-like structures which form the positive electrode plates 8 are made of a positive electrode mass and are applied on both sides to the carrier foil 2. The electrode mass may consist of a mixture of activated charcoal, soot and manganese-chloride-electrolyte. The electrode mass is applied to the carrier foil in as loose as possible condition thus permitting air to permeate therethrough to carrier foil 2.

Care must be taken that the electrode mass initially adheres to the carrier foil 2 before it is permanently held by a stiffening lacquer as will be described in more detail below. In the case of some carrier foils, initial adhesion may be achieved by simply moistening the conductive foils 6 with benzene. Alternately, a solution of polyisobutylene which is mixed with soot may be sprayed onto the conductive foils 6 for gluing. Alternately or additionally, holes 10 may be provided in the carrier foil 2 so that the two loose plate-like electrode mass structures are mutually held on the carrier foil 2 through the holes 10. Additionally, it will be possible to cover at least the lower narrow side of the positive electrode arrangement with a strip of plastic insulating material. Preferably, a U-shaped frame 12 is formed from strips and surrounds the three narrow sides, namely the two lateral sides and the lower side.

Air feeders 14 provide aeration of the positive electrode plates 8 during operation and are provided in a cover plate 16. Cover plate 16 covers the front side of the positive electrode arrangement. In order to apply the positive electrode mass 8, the carrier foil 2, the cover plate 16 and possibly the U-shaped frame 12 are collectively placed into a press. The electrode mass 8 is then pressed between these parts and onto the two sides of the carrier foil 2.

Subsequently, the entire structure is dipped into a stiffening lacquer up to a point where the cover plate 16 is whetted. A preferable stiffening lacquer is, for example, a cellulose triacetate solution. The lacquer coating 18 which contracts during drying will securely and firmly hold all components together. Also, the lacquer coating 18 will hold the components especially well whenever the width of cover plate 16 is somewhat smaller than the overall width of the carrier foil 2 and electroplates 8.

Figure 3B:
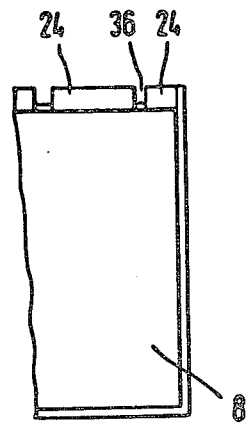
FIG. 3b is a side view of another embodiment of a frame and cover for the electrode arrangement.

In order to prevent stiffening lacquer and, during operation the electrolyte, from penetrating into the positive electroplates 8 during the dipping process, air feeders 14 must be laterally protected. This protection may be accomplished in various ways. For example, the entire cover plate 16 may be surrounded by a frame 20 (see FIG. 1 and FIG. 3a) so that a flat shell results. Alternately, it is possible to surround each individual air feeder 14 by a pipe socket 22 (FIG. 2) or to jointly surround several air feeders 14 by a frame 24 (FIG. 3b).

The positive electrode arrangement has a connecting lug (not shown) for a down lead of the current, which on top projects through the cover plate or may project laterally.

The positive electrode arrangement thus formed may be put into a container for the formation of an element assembly. The container preferably contains a negative electrode made of zinc sheet and bent, for example U-shaped, in such a way that the two legs of the negative electrode surround the two positive electroplates 8, whereby electrolyte in the form of manganese-(II)-chloride solution with a thickening agent is filled between both electroplates.

Figure 6:
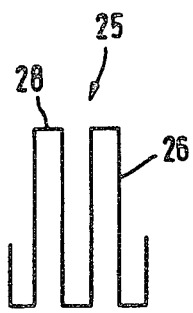
FIG. 6 is a schematic plan view of the sinuous folding according to the present invention.

In order to produce elements of greater specific carrying capacity, positive electrode plates 8' are pressed onto a continuous stripe-shaped carrier foil 2' on both sides as can be seen in FIGS. 4 and 5. A space 9 remains between the electrode plates 8' which subsequently permits a rectangular folding of the positive electrode arrangements. The positive electrode arrangement as well as the negative electrode are rectangularly folded in the shape of a meander. The terms "meander" or "rectangularly folded" are intended to refer to a structure 25 according to FIG. 6 which has a number of long legs 26 and short legs 28 connecting them at generally right angles thereby forming a generally square wave shape.

FIG. 7 depicts a plan view of the positive electrode arrangement, rectangularly folded in a meander-shape. Cover plates 16 form the long legs 26 with the remaining parts of the positive electrode arrangement lying underneath. The long legs 26 are interconnected by the 5 pieces of carrier foil 2' which form the short legs 28 of the meander shape.

Referring to FIG. 8, the negative electrode 30 is preferably punched from a zinc sheet. Its overall height h1 is equal to or somewhat greater than the overall height h2 of the positive electrode arrangement and inclusive of the cover plate 16 and of frame 20 or pipe connections 22. The negative electrode 30 has recesses 32 the height h3 of which is greater than the height h4 of the positive electrode arrangement so that the remaining bridge 34 of the negative electrode may cross the carrier foils 2' without touching the two meanders.

FIG. 9 shows how the positive and negative electrodes interlock, each by itself rectangularly folded in a meander shape. The negative electrode 30 with its bridges 34 crosses the positive electrode arrangement somewhat in front of their respective ends. Both electrodes are secured against slipping in the direction of the long meander legs 26 by the fact that the bridges 34 of the negative electrode are either guided through slides 36 between frame 24 of the cover plate 16 (see FIG. 3b), or that they are positioned between pipe connections 22. Preferably, it is more effective to guide the bridges 34 through a slit 38 (see FIG. 3a) directly beside the upper end of the frame 12.

The positive and negative electrodes at one of their ends have connecting lugs 40, 42, respectively, for a current down-lead.

While the present invention has been described herein in what is presently conceived to be the most preferred embodiments thereof, it may be apparent to those in the art that many modifications may be made within the spirit and scope of the present invention, which scope is to be accorded the broadest interpretation of the appended claims so as to encompass all equivalent structures and assemblies.

What I claim is:

1. A primary atmospheric oxygen element of reduced thickness comprising:
   (a) positive electrode means providing a positive electrode,
   (b) negative electrode means providing a negative electrode,
   (c) an electrolyte solution containing manganese (II) chloride operatively associating said positive and negative electrode means,
   (d) the electrolyte solution containing a thickening agent;
   (e) container means containing said positive and negative electrodes and said electrolyte, wherein said positive electrode means comprises:
   (i) a substantially planar carrier means for conducting an electric current therethrough, including a central planar metallic foil and planar conductive sheets substantially covering each side of said metallic foil;
   (ii) air permeable positive electrode substance;
   (iii) means adhering said positive electrode substance to said planar conductive sheets on each side of said carrier means;
   (iv) rigid cover means covering a narrow front side of said positive electrode substance and said cover means defining a plurality of openings allowing the passage of air therethrough to said positive electrode means;
   (v) coating means comprising a varnish substantially coating the exterior surfaces of said positive electrode means and securely assemblying said cover means and said positive electrode substance; and
   (vi) protection means protecting said openings from being coated by said coating means.

2. An atmopsheric oxygen element as in claim 1 wherein said protection means comprises an upwardly extending wall member positioned continuously around the periphery of said cover means.

3. An atmospheric oxygen element as in claim 1 wherein said protection means comprises a plurality of upwardly extending wall members, each extending around a predetermined plurality of said openings.

4. An atmospheric oxygen element as in claim 2 or 3, wherein said adhering means adheres said positive electrode substance on each side of said carrier means at longitudinally spaced apart intervals and wherein said carrier means is folded in a generally square wave shape forming a plurality of first and second generally planar leg portions, said first leg portions having said positive electrode substance on each side thereof and said second leg portions comprising said intervals between adjacent ones of said longitudinally spaced apart positive electrode substance, said negative electrode means including a plurality of alternating skirt and bridge portions and being folded in a square wave shape and positioned relative to said carrier means wherein said skirt portions extend between adjacent ones of said positive electrode substance on adjacent ones of said first leg portions and said bridge portions extend across a portion of respective said cover means covering associated ones of said positive electrode substance.

5. An element as in claim 4 further comprising retaining means preventing said bridge portions from substantially shifting in the longitudinal direction, said retaining means including a gap defined by predetermined adjacent ones of said wall members into which a portion of a corresponding one of said bridge portions is positioned and held thereby.

6. An element as in claim 4 further comprising a U-shaped insulating member covering the lower and opposing lateral surfaces of said positive electrode substance, and retaining means preventing said bridge portions from substantially shifting in the longitudinal direction, said retaining means including a gap defined between said wall member and the upper end portion of said U-shaped member into which a portion of a corresponding one of said bridge portions is positioned and held thereby.

7. An atmospheric oxygen element as in claim 1 wherein said protection means comprises a plurality of upwardly extending wall members corresponding to the plurality of said openings, each of said wall members positioned with a corresponding one of said opening around the periphery thereof.

8. An atmospheric oxygen element as in claim 1 wherein said adhering means includes a plurality of apertures defined by said planar carrier means so that portions of said positive electrode means on either side thereof will be in a face to face contacting relationship.

9. An atmospheric oxygen element as in claim 1 wherein at least the lower surface of said positive electrode means is provided with a covering strip of insulating material.

10. An atmospheric oxygen element as in claim 9 wherein each opposing lateral side of said positive electrode means is provided with a covering strip of insulating material.

11. An atmospheric oxygen element as in claim 10 wherein said insulating strip covering said lower surface and said opposing lateral surfaces is in the form of a U-shaped member.

12. An atmospheric oxygen element as in claim 10, wherein said adhering means adheres said positive electrode substance on each side of said carrier means at longitudinally spaced apart intervals and wherein said carrier means is folded in a generally square wave shape forming a plurality of first and second generally planar leg portions, said first leg portions having said positive electrode substance on each side thereof and said second leg portions comprising said intervals between adjacent ones of said longitudinally spaced apart positive electrode substance, said negative electrode means including a plurality of alternating skirt and bridge portions and being folded in a square wave shape and positioned relative to said carrier means wherein said skirt portions extend between adjacent ones of said positive electrode substance on adjacent ones of said first leg portions and said bridge portions extend across a portion of respective said cover means covering associated ones of said positive electrode substance.

13. A primary atmospheric oxygen element as in claim 1, wherein said carrier means is folded in a generally square wave shape forming a plurality of first and second generally planar leg portions;

said negative electrode means having a plurality of alternating skirt and bridge portions, said negative electrode means being folded in a square wave shape and positioned relative to said carrier means so that said skirt portions extend between adjacent ones of said positive electrode means on said first leg portions and said bridge portions extend across a portion of said cover means associated with said elements.

14. An element as in claim 13 wherein said protection means comprises an upwardly extending wall member positioned continuously around the periphery of said cover means.

15. An element as in claim 13 wherein said protection means comprises a plurality of upwardly extending wall members, each of said wall members extending around a predetermined plurality of said openings.

16. An element as in claim 13 wherein said protection means comprises a plurality of upwardly extending wall members corresponding to the plurality of said openings, each of said wall members positioned with a corresponding one of said opening around the periphery thereof.

17. An element as in claim 13 wherein said adhering means includes a plurality of apertures defined by said planar carrier means so that portions of said positive electrode means on either side thereof will be in a face to face contacting relationship.

18. An element as in claims 13, 14, 15 or 16 wherein at least the lower surface of said positive electrode means is provided with a covering strip of insulating material.

19. An element as in claim 18 wherein each opposing lateral side of said positive electrode means is provided with a covering strip of insulating material.

20. An element as in claim 19 wherein said insulating strip covering said lower surface and said opposing lateral surfaces is in the form of a U-shaped member.

21. An element as in claim 15 or 16 further comprising retaining means preventing said bridge portions from substantially shifting in the longitudinal direction, said retaining means including a gap defined by predetermined adjacent ones of said wall members into which a portion of a corresponding one of said bridge portions is positioned and held thereby.

22. An element as in claim 20 further comprising retaining means preventing said bridge portions from substantially shifting in the longitudinal direction, said retaining means including a gap defined between said wall member and the upper end portion of said U-shaped member into which a portion of a corresponding one of said bridge portions is positioned and held thereby.

23. A primary atmospheric oxygen element comprising:
(a) positive electrode means providing a positive electrode,
(b) negative electrode means providing a negative electrode,
(c) an electrolyte containing manganese (II) chloride operatively associating said positive and negative electrode means,
(d) container means containing said positive and negative electrodes and said electrolyte, wherein said positive electrode means comprises:
  (i) a substantially planar carrier means folded in a generally square wave shape forming a plurality of first and second generally planar leg portions for conducting an electric current therethrough, said carrier means including a central planar metallic foil and planar conductive sheets substantially covering each side of said metallic foil on said first leg portions;
  (ii) air permeable positive electrode substance;
  (iii) means adhering said positive electrode substance to said planar conductive sheets on each side of said carrier means of said first leg portions;
  (iv) rigid cover means covering said positive electrode substance, said cover means defining a plurality of openings allowing the passage of air therethrough to said positive electrode substance;
  (v) coating means comprising a varnish substantially coating the exterior surfaces of said positive electrode means and securely assembling said cover means and said positive electrode substance; and
  (vi) protection means protecting said openings from being coated by said coating means, and wherein
said negative electrode means is folded in a square wave shape to define a plurality of alternating skirt and bridge portions and is positioned relative to said carrier means to permit said skirt portions to extend between adjacent ones of said positive electrode means on said first leg portions, said bridge portions extending across a portion of said cover means associated with said positive electrode means to establish parallel connection of said positive and negative electrode means.

* * * * *